United States Patent [19]

Frazier

[11] 4,222,080
[45] Sep. 9, 1980

[54] VELOCITY TOLERANT DECODING TECHNIQUE

[75] Inventor: Giles R. Frazier, Austin, Tex.

[73] Assignee: International Business Machines Corporation, Armonk, N.Y.

[21] Appl. No.: 971,969

[22] Filed: Dec. 21, 1978

[51] Int. Cl.³ .............................................. G11B 5/09
[52] U.S. Cl. ........................................ 360/40; 360/51
[58] Field of Search ...................... 360/40, 42, 43, 44, 360/51

[56] References Cited

U.S. PATENT DOCUMENTS

| | | | |
|---|---|---|---|
| 3,597,751 | 8/1971 | Heidecker et al. | 360/43 |
| 3,727,202 | 4/1973 | Fort | 360/42 |
| 3,795,903 | 3/1974 | Lindsey | 360/42 |
| 3,828,167 | 8/1974 | Goldfarb | 360/42 |
| 4,040,100 | 8/1977 | Chan | 360/43 |

OTHER PUBLICATIONS

Encoding Serial Data for Error Minimization & Error Recovery—Webb et al., IBM T.D.B., vol. 16, #6, 11/73.
Standard 3M Recording Techniques Could Spur Low-Cost μC Use—Kramer, EDN 5/5/78, pp. 75–81.

Primary Examiner—Vincent P. Canney
Attorney, Agent, or Firm—Douglas H. Lefeve

[57] ABSTRACT

A decoding technique applicable to binary data encoded by phase encoding (PE), frequency modulation (FM), or modified frequency modulation (MFM). Re-synchronization of the decoding clocking circuitry occurs upon every flux transition, rather than at less than all flux transitions, such as only at each data flux transition in the case of phase encoding. The technique provides substantially greater velocity tolerance than previous techniques for decoding codes encoded in this manner.

19 Claims, 7 Drawing Figures

VELOCITY TOLERANT DECODING TECHNIQUE

DESCRIPTION

BACKGROUND OF THE INVENTION

1. Field of the Invention

This invention relates to the decoding of phase encoded data, frequency modulation encoded data or modified frequency modulation encoded data. More specifically, this invention is primarily directed to minimizing the number of errors that occur in reading a block of data, and a related advantage of this method over prior techniques is that the amount of data lost per error incident is minimized.

2. Description of Prior Art (Prior Art Statement)

Representation of the closest known prior art is U.S. Pat. No. 3,795,903 to Royce Darwin Lindsey, filed Sept. 29, 1972, issued Mar. 5, 1974, entitled "Modified Phase Encoding", the IBM Memory Typewriter, announced Mar. 1, 1974, employing a phase encoding technique described generally by the Lindsey patent and more particularly by a publication to G. T. Webb and L. K. Whitfield, IBM *Technical Disclosure Bulletin*, Vol. 16, No. 6, p. 1760 (November, 1973). Also relevant is a publication to Joel A. Kramer, EDN, pages 75-81 (May 5, 1978).

U.S. Pat. No. 3,795,903 describes an encoding and decoding technique for phase encoded data, including a technique for detecting loss of phase and/or bit synchronization, and resynchronization following an error. For defining each multi-bit character or data segment, an additional one-half bit time is added between characters and encoded such that a corrective flux reversal may occur at one-half T (where T equals the normal intra character bit time) and a transition between characters must not occur at one T after the last data transition of the character. For decoding, windows are established in accordance with a predetermined nominal data rate and the timing for these windows is resynchronized at each data transition, but not at the corrective flux transitions that occur between data bits of the same binary value. If the last bit of one character is of opposite value to the first bit of the immediately following character, no corrective flux reversal transition is necessary between these characters, and one and one-half bit times elapses between any transition in the coding. Assuming this coding is recorded on a magnetic media, bit shifting sometimes occurs within this region of two transitions separated by one and one-half bit times, as an inherent property of magnetic recording is that substantially separated flux transitions sometimes appear to move closer together on the magnetic media. During decoding of this flux transition pattern, the transitions may therefore not be aligned with the designated windows for decoding, and errors will, accordingly, be indicated. Also, one and one-half bit times elapse before resynchronizing the detection logic with the transitions read from the media.

In the IBM Memory Typewriter, a magnetic recording phase encoding technique slightly modified from that described above includes a flux transition at one-half bit time after the last date bit of each character and another flux transition at one and one-half bit times after the last data bit of each character. The first data bit flux transition of the following character occurs at two and one-half bit times after the last data bit transition of the previous character. If the last data bit of a character has the same binary value as the first data bit of the succeeding character, a corrective flux transition occurs at two bit times after the last data transition of the previous character. Thus, one bit time is the maximum time between flux transitions. This substantially lessens the error rate due to the bit shifting described above, but since resynchronization of the clocking circuitry that provides the windows for decoding occurs only at data transition times and at the transition occurring one and one-half bit times after the last bit of a data segment, one and one-half bit times still elapse between each character during which time the detection clocking circuitry is not reset. Therefore, media velocity variations that occur between characters are just as prone to cause errors, since the clocking circuitry is still not reset for one and one-half bit times rather than for one bit time as is the case between data transitions within the character.

Readjustment of analog clocking circuitry at each transition has been found in the prior art. However, analog techniques make use of variable frequency oscillators which do not synchronize as rapidly or over as wide a range as is often necessary in inexpensive drive mechanisms whose media velocities may be rapidly varying. Furthermore, analog components are usually too expensive and bulky to be advantageous in low-cost systems.

Pure digital logic implementations of decoding circuitry which resynchronize at each flux transition have been found in the prior art with respect to a few specialized fixed length and variable length codes. The specialized codes which are decodeable by prior art digital logic techniques and which resynchronize at each transition often use more space on a magnetic media to encode a given binary data sequence than the efficient codes used herein, and are, therefore, undesireable. The ratiometric code described in the referenced Kramer article is an example of a code of this type. Variable length codes are also not as preferrable as the fixed length codes used herein because the physical media requirements to record a block of data encoded in a variable length code is unpredictable, and more room is required for recording data in this manner since enough room must be allowed on the media for a worst case of a relatively high percentage of "long" characters. Finally, previous decoding techniques have often required characters within the data stream to be separated by means of relatively large gaps between transisstions which are susceptible to bit shift, and these large inter-character gaps are not a requirement of the decoding methods explained herein.

It would, therefore, be advantageous to utilize a very efficient digital technique for resynchronizing the decoding clocking logic on every transition in a compact, fixed length code which achieves greater velocity tolerance of a magnetic media relative to a read/record head. It would also be benefical for the technique to include the ability to separate data into characters without large gaps between transitions, the capability of resynchronizing the clocking logic with a loss of no more than one character, and the capability of adapting to a wide range of data rates while also achieving a high bit density due to the fixed length nature of the code.

SUMMARY OF THE INVENTION

Accordingly, a decoding technique is provided in which substantially greater velocity tolerance is achieved during decoding of the fixed length code described above when compared to the velocity tolerances of the prior art techniques described above. This decoding technique is also applicable to other fixed length codes than that of the above-mentioned prior art (U.S. Pat. No. 3,795,903) and has numerous other advantages; however, as an example of the decoding technique, its implementation on the coding method of the prior art above will be described in detail, and its advantages over the method presented therein will be emphasized. It will then be shown how the techniques of this example are extended to frequency modulation encoded data and modified frequency modulation encoded data.

An efficient technique of distinguishing data flux transitions from corrective flux transitions or intercharacter flux transitions is presented below for PE and FM. (Note that for FM, however, transitions are more commonly referred to as "clock transitions" and "data transitions", and the data stream is seen as being divided into "bit cells" with a clock transition occurring at the end of each bit cell and a data transition occurring at the midpoint of a bit cell containing data of binary value one.) For both codes, however, the identification of each flux transition is accomplished by: (1) separating the sequence of flux changes into a sequence of long and short pulses and (2) looking for odd or even numbers of short pulses that have occurred since the last long pulse. If a long pulse occurs and an odd number of short pulses have occurred since the last long pulse, then the transition at the end of the pulse is an intercharacter flux transition. If a short pulse occurs and an odd number of short pulses have occurred since the last long pulse, then the transition at the end of the pulse is a corrective flux reversal for PE or a data transition for FM. All other transitions are data transitions for PE or clock transitions for FM.

Logic circuitry to sense these conditions and react thereto in accordance with the above provides an efficient technique for decoding this code. Velocity tolerance greater than that known to be achieved in the prior art techniques described above is achieved here because clocking circuitry to distinguish between long, and short pulses is reset at every flux transition, corrective, intercharacter, or data, and not at the data transitions only. Thus, the maximum time that can elapse between resetting of the clock circuitry is one bit time, rather than one and one-half bit times as described by the prior art techniques above.

For MFM, wherein there are three possible flux change separations (referred to as short, middle, and long pulses) an efficient technique for decoding is to (1) separate the flux change sequence into a sequence of long, middle, and short pulses, (2) looking for a long pulse or a short or middle pulse with an even number of intervening middle pulses having occurred since the last long pulse, or looking for a short or middle pulse with an odd number of middle pulses having occurred since the last long pulse. If a long pulse or a short or middle pulse with an even number of intervening middle pulses having occurred since the last long pulse is detected, then a one is output if the next pulse is a short pulse, a zero is output if the next pulse is a middle pulse, and a zero followed by a one is output if the next pulse is a long pulse. Likewise if a short or middle pulse with an odd number of middle pulses having occurred since the last long pulse is detected a zero is output if the next pulse is a short pulse, a zero followed by a one is output if the next pulse is a middle pulse, and an intercharacter mark is recognized if the next pulse is a long pulse.

The clocking logic to distinguish between long, middle, and short pulses in one embodiment described herein compares the length of time between transitions to a predetermined reference time for a long pulse. Thus, the speed at which the coding is to be read for decoding purposes is assumed to maintain a nominal speed within a given tolerance. In another embodiment of this invention shown herein, however, the length of time between incoming pulses is not compared to a predetermined reference time, but, instead, is compared to the time duration and characteristic (long, middle, or short) of the previous pulse. Thus, even greater velocity tolerance is achieved with this technique than is achieved with the other, previously described, embodiment of this invention, because with the latter technique it is not a requirement that the duration of incoming pulses be comparable to a nominal value. Instead, if the duration of incoming pulses change relatively slowly compared to a bit time, even over a wide range, no errors will occur in decoding the code.

The foregoing and other objects, features, extensions, and advantages of the invention will be apparent from the following more particular description of preferred embodiments of the invention, as illustrated in the accompanying drawings.

DESCRIPTION OF THE PREFERRED EMBODIMENTS

Figure 1:
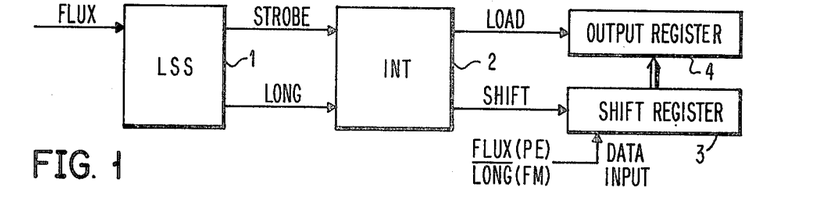
FIG. 1 is a block diagram illustrating the structure for decoding and detecting errors in data recorded according to the techniques of either phase encoding or frequency modulation.

Referring to FIG. 1, flux changes, either positive going or negative going, are applied to the long-short separator 1, via the FLUX line. The function of the long-short separator 1 is to provide a strobe output via the STROBE line at every flux transition and a positive output on the LONG line when a nominally long time duration between transitions has been sensed. The STROBE and LONG outputs are applied to the interpreter 2. The function of the interpreter 2 is to cause decoded data bits to be loaded into the shift register 3 as they are detected and to sense the end of a complete character or sequence of data bits so that the character is transferred from the shift register 3 to the output register 4 in response to a positive signal on the LOAD line output. The signal on the FLUX line is also applied to shift register 3.

Figure 2:
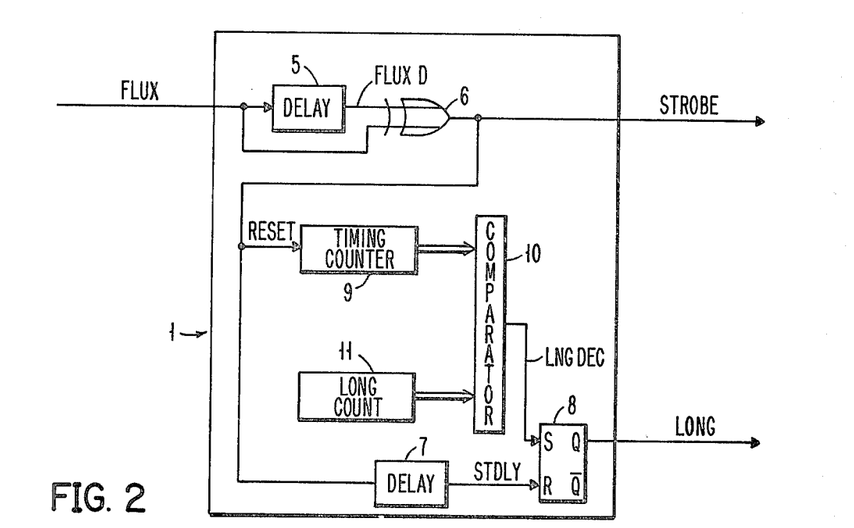
FIGS. 2 and 5 are schematic diagrams of two preferred embodiments of the long-short separator portion of the decoding technique of this invention.
Figure 4:
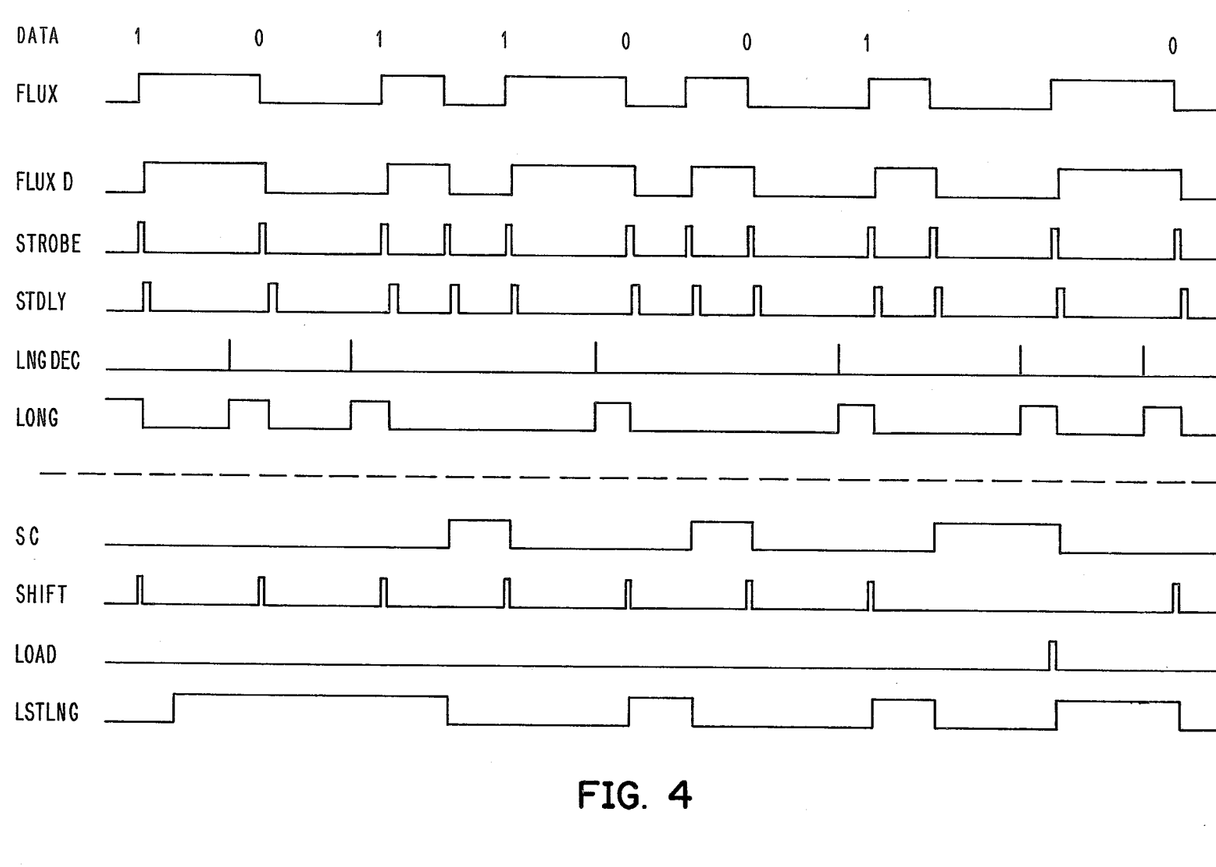
FIG. 4 is a timing diagram depicting the operation of the logic circuitry of FIGS. 2, 3, and 5.

Referring now to FIG. 2, a schematic logic diagram of a preferred embodiment of the long-short separator 1 is shown. It is also helpful to refer to the timing diagram of FIG. 4 for this description of FIG. 2. In FIG. 2 the flux signal from a magnetic reading circuit is applied to the delay circuit 5 and exclusive-OR circuit 6 via the FLUX line. This provides a relatively short pulse following each flux change that is output from the circuit along the STROBE line. The strobe pulse is applied to a reset input of timing counter 9 and is also applied through a delay circuit 7 to the reset input of S-R flip-flop 8 along the STDLY (strobe delay) line. Referring to FIG. 4, it will be understood that delay circuits 5 and 7 are of the type that are responsive to an input waveform a fixed delay time later. Thus, delay circuits 5 and 7 go positive a fixed time after the waveforms on the FLUX and STROBE line, respectively, go positive, and they return to zero this same, fixed time after the waveforms on the FLUX and STROBE lines, respectively, return to zero.

The count of counter 9 is applied to an input of comparator 10. The count that will be reached when a nominal long period (as opposed to a short period) occurs between flux transitions is applied to the other input of comparator 10. Timing counter 9 continually counts upward during operation of the circuit, but is reset to zero for upward counting from zero at each strobe pulse. If counter 9 counts up to a count equal to that of the long count stored in register 11, comparator 10 provides a positive output on the LNGDEC line thereof that is applied to the set input of flip-flop 8. The setting of flip-flop 8 provides a positive signal on the LONG output thereof. Flip-flop 8 is reset by the positive signal on the STDLY line from delay circuit 7.

Thus, when a long period between transitions is sensed, a positive signal is provided on the LONG line and this signal remains positive until it is reset by the positive STDLY signal following the next strobe pulse.

Figure 3:
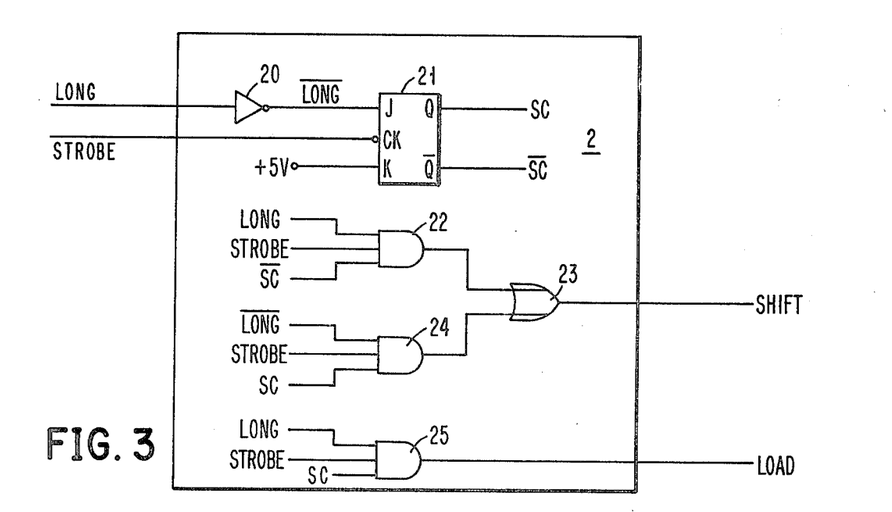
FIG. 3 is a schematic diagram of the interpreter portion of the decoding circuitry of this invention.

Referring now to FIG. 3, a schematic logic diagram of the interpreter 2 of FIG. 1 is shown. The signal on the STROBE line is applied to the clock input of a J-K flip-flop 21. The signal on the LONG line is inverted by inverter 20 and applied to the J input of flip-flop 21. A positive voltage, for example 5 volts, is continuously applied to the K input of flip-flop 21. The SC signal from the Q output of flip-flop 21 is applied to AND gates 24 and 25, while the $\overline{SC}$ signal from the $\overline{Q}$ output of flip-flop 21 is applied to an input of AND gate 22. The signal on the LONG line is applied to inputs of AND gates 22 and 25, while the inverted $\overline{LONG}$ signal is applied to an input of AND gate 24. The strobe signal is applied to each of the AND gates 22, 24, and 25. The outputs of AND gates 22 and 24 are applied to inputs of the OR circuit 23.

In accordance with the well known truth table for the J-K flip-flop:

J K $Q^{n+1}$
0 0 $Q^n$
0 1 0
1 0 1
1 1 $Q^{\overline{n}}$ the operation of the interpreter circuit 2 is now described. With a continuous positive input to the K input of flip-flop 21, only two of the four possible characteristics of the J-K flip-flop are utilized. Assume now that a strobe pulse is applied to flip-flop 21 when a positive signal was present on the LONG line. A zero is, therefore, present on the J input of flip-flop 21 and the Q output thereof becomes zero at the fall of the strobe pulse. With the Q output at zero, the $\overline{Q}$ output becomes positive and the positive signal on the $\overline{SC}$ line is applied to an input of AND gate 22 while the zero level on the SC line is applied to inputs of AND gates 24 and 25. During the strobe pulse an output is present on the SHIFT line if SC=0 before the strobe pulse or an output is present on the LOAD line if SC=1 before the strobe pulse.

Assume that on the next strobe pulse, a positive signal is again present on the LONG line. At this time a positive output at AND gate 22 will result and will be gated through OR circuit 23 to provide a positive output signal on the SHIFT line that is applied to shift register 3. This signal on the SHIFT line will shift the flux level just after the transition ending the long pulse into the shift register 3 as a data bit.

Assume now that a short pulse is detected which results in a low level on the LONG line. This low level is inverted by inverter 20 to provide a positive signal on the $\overline{LONG}$ line that is applied to the J input of flip-flop 21. At the leading edge of the next strobe pulse, no signal is gated through any of the three AND gates, since none of the AND gates has all inputs positive. At the falling edge of this next strobe pulse, flip-flop 21 changes states in accordance with the truth table above when both inputs have positive signals applied thereto. Thus, a positive level is provided on the Q output of flip-flop 21 that is applied along the SC line to inputs of AND gates 24 and 25. In this case, an odd number of short pulses has occurred since the last long pulse so the transition ending the short pulse is not a data transition. Therefore, neither the shift line nor the load line is driven positive.

Assume that the next pulse is also short. At the next strobe signal, AND gate 24 will provide a positive level on the SHIFT line to cause the next data bit to be shifted into the shift register. At the falling edge of this strobe pulse, the levels on the outputs of flip-flop 21 are reversed so that the Q output is again driven to a low level and the $\overline{Q}$ output is again positive.

Assume that the next pulse is a long pulse. At the leading edge of the next strobe signal AND gate 22 will provide a positive signal that is gated through OR gate 23 to provide a shift pulse to shift register 3. Referring to the FLUX waveform of FIG. 4, the waveform is negative-going at this time and the data bit shifted into shift register 3 is a zero. At the falling edge of this strobe signal, the Q output of flip-flop 21 remains low, which provides a positive signal at the $\overline{Q}$ output thereof.

Assume now that the next pulse duration is short. At the next strobe pulse no outputs are provided by the AND gates and flip-flop 21 reverses states at the falling edge of this strobe pulse.

Assume that the following pulse is also short. At the next strobe signal AND gate 24 provides a positive output that is gated through OR gate 23 to provide a shift pulse to the shift register 3. Referring to the FLUX waveform, FIG. 4, the negative going flux transition at this time provides another zero data bit to shift register 3 and the previous flux transition was a corrective flux reversal. At the falling edge of this strobe pulse, the states at the outputs of flip-flop 21 reverse and the $\overline{Q}$ output provides a positive signal, while the Q output provides a low level.

Assume now that the next pulse duration is long. At the next strobe pulse AND gate 22 provides a positive output that is gated through the OR gate 23 to provide a positive level on the SHIFT line that is applied to shift register 3. Referring to the FLUX waveform of FIG. 4, the positive going transition at this time provides a one bit to shift register 3. At the falling edge of this strobe pulse, the output states of flip-flop 21 remain the same.

Assume that the next pulse duration is short. At the next strobe pulse there is no output from any of the AND gates, and at the falling edge of this strobe pulse, the output states of flip-flop 21 reverse to provide a positive signal on the SC line and a low level on the $\overline{SC}$ line.

If the next pulse duration is long, a positive output will be provided by AND gate 25 that is applied along the LOAD line to output register 4. This gates the contents of shift register 3 into output register 4 and indicates that a complete character has been decoded.

It will be understood by those skilled in the art that one way in which this technique differs from the technique taught in the referenced U.S. Pat. No. 3,795,903 is that no bit counter is utilized. When the condition of one long pulse duration following an odd number of short pulse durations is met, the end of the character has been reached by definition. Utilizing the present system, therefore, data may be encoded and detected by this method in situations in which the characters of the data have varying numbers of bits.

In the long-short separator 1 of FIG. 2 it is seen that the timing counter 9 is reset at every flux transition. Utilizing the encoding technique that is used in the above-referenced IBM Memory Typewriter, transitions occur at no greater separtion than one bit time. However, with either the IBM Memory Typewriter decoding technique or the technique taught in the referenced U.S. Pat. No. 3,795,903, the prior art timing logic was only reset at data or intercharacter transitions which could be separated by up to one and a half bit times. Thus, the present technique has a inherent velocity tolerance improvement of at least 33 percent because 33 percent more timing error can accumulate in three-halves bit time than in one bit time.

The above data decoding technique was described as it applied to the decoding of PE data as used in U.S. Pat. No. 3,795,903. However, if the data input to the shift register 3, of FIG. 1 is changed from FLUX to $\overline{LONG}$, the decoder will decode FM encoded data instead of PE data with all the above-mentioned advantages and velocity tolerance as with PE. No other changes in the circuitry are required, and intercharacter markers are still recognizeable by an odd number of short pulses followed by a long pulse.

Figure 5:
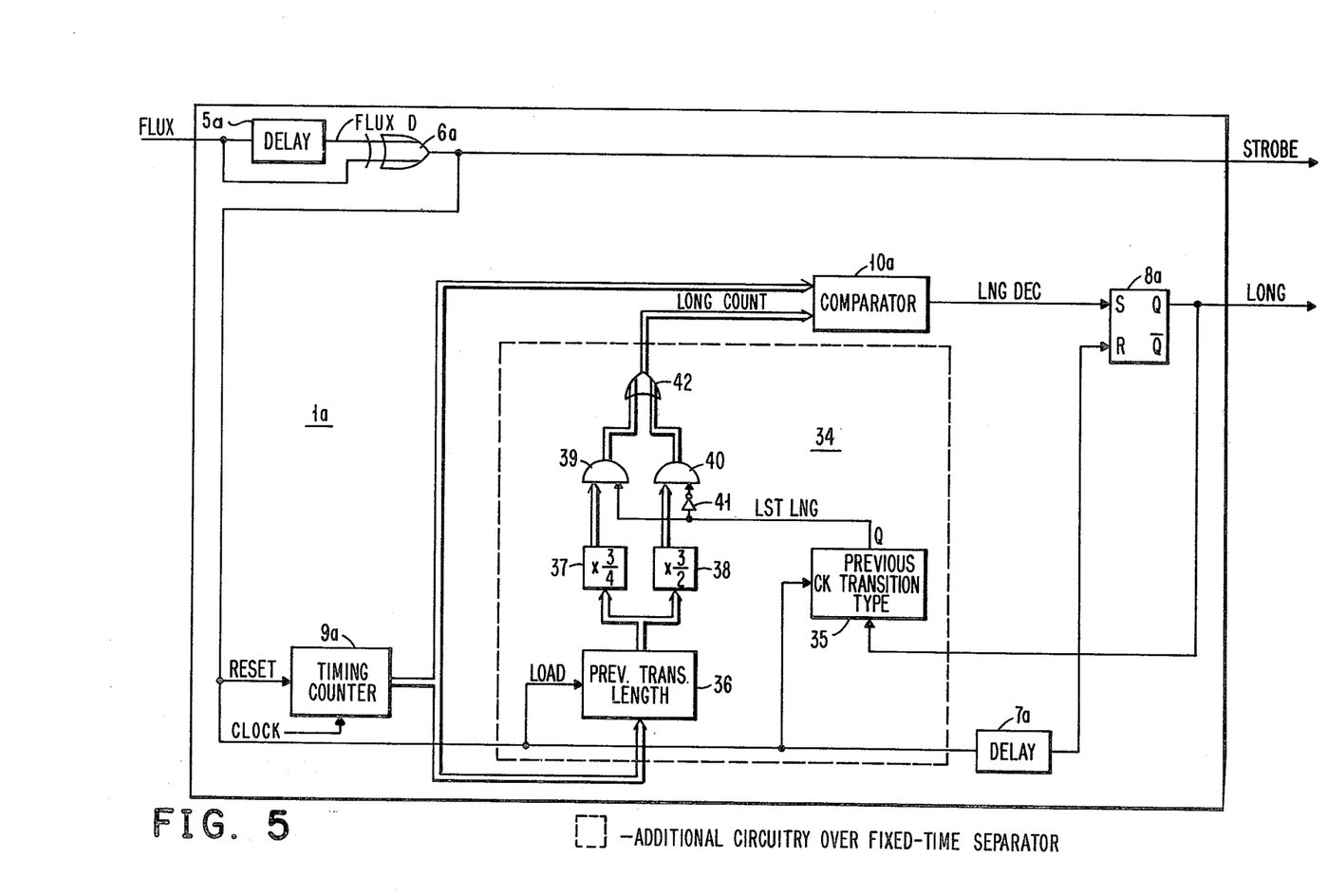

Utilizing the long-short separator 1a in FIG. 5 for the long-short separator 1 in FIG. 1, an even greater velocity tolerance improvement for both FM and PE, beyond that obtained by the long-short separator 1 in FIG. 2, can be realized.

The difference between the long-short separator of FIG. 5 and the long-short separator of FIG. 2 is that the long count reference to the comparator 10a in the circuit of FIG. 5 is derived for each transition as a function of the previous pulse duration, rather than being an absolute reference number.

In the circuit of FIG. 5, the logic component having referenced numerals ending with "a" (for example, 5a, 6a, etc.) have the same function as the corresponding elements without the suffix letter in the circuit of FIG. 2. The difference in circuits is found in the long count derivation logic 34 shown within the dashed box in FIG. 5. At each strobe pulse the type of previous transition (i.e., long or short) is loaded into the D flip-flop 35 and the highest count from timing counter 9a that was achieved immediately before the strobe pulse is loaded into the previous transition length register 36. Multipliers 37 and 38 provide numbers corresponding to three-fourths of the count corresponding to the previous transition length and three halves of the count corresponding to the previous transition length, respectively, which counts are applied to inputs of multiple two-input AND gates 39 and 40, respectively. If the previous pulse was a long pulse, then the Q output of flip-flop 35 will be positive and the count from multiplier 37 is gated through multiple two-input AND gates 39 and the multiple two-input OR circuits 42 to the LONG COUNT input of comparator 10a. Thus, if the next pulse has a duration at least three-fourths that of the immediately previous pulse that was determined to be a long pulse, the following pulse will, likewise, be classified as a long pulse.

If the previous transition was a short pulse, then the Q output of flip-flop 35 will be low and inverter 41 will invert this low level on the LSTLNG line to enable multiple two-input AND gates 40 to gate the count from multiplier 38 through the multiple two-input OR circuits 42 to the LONG COUNT input of comparator 10a. Thus, a pulse immediately following a short pulse will be designated a long pulse if it is at least three halves the duration of the short pulse.

It will, therefore, be realized that with a relatively low rate of change of speed of reading the encoded data, the speed can vary over a wide range over a long term. This is because the pulses are no longer referenced to a predetermined length of a long pulse, but instead, each pulse duration is compared to the duration of the previous pulse. This technique allows recording and playback of data to occur at different data rates, or allows data to be read back from inexpensive magnetic media transport mechanisms whose instantaneous and average speeds may be varying rapidly over a very wide range. It also allows the same decoding logic to decode data of varying densities on the same drive mechanism without adjustment of the drive speed or any other parameter because the logic will automatically adapt to the incoming data rate.

It has been shown that a very minor modification to the diagram of FIG. 1 enables the circuitry to decode FM instead of PE. With a number of relatively simple additions to the circuitry, the system will decode the well known encoding method known as modified frequency modulation (MFM). The modifications necessary for decoding MFM are now described.

Referring again to FIG. 1, instead of a single line between the long-short separator 1 and the interpreter 2 for specifying the transition length (as was the case for PE and FM), two lines are necessary to specify the FLUX change length for MFM. These two lines are necessary because there are three possible transition lengths in MFM (referred to as "short", "middle", and "long" pulses), whereas there are only two comparable lengths in PE and FM. Also, whereas the FLUX or $\overline{LONG}$ line was used as a data input to the shift register 3 for PE and FM, respectively, another signal, derived inside the interpreter and further specified below, must be used as a data input to the shift register 3 for MFM.

Figure 6:
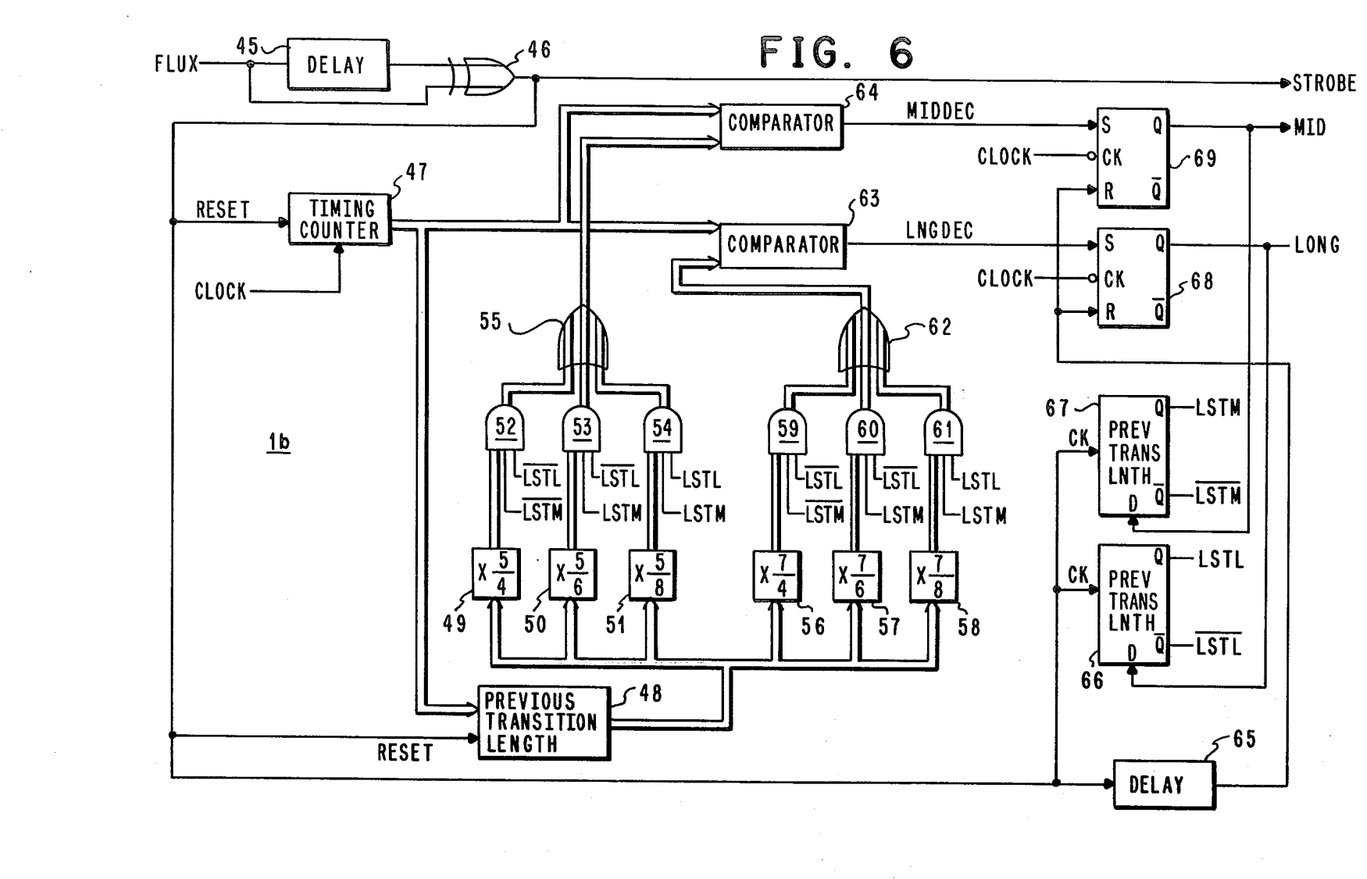
FIG. 6 is a schematic diagram of the separator portion of the decoding circuitry for MFM decoding.

Referring now to FIG. 6, a schematic diagram for a separator for MFM encoded data is shown. It can be seen that the separator of FIG. 6 is similar to the separator of FIG. 5. Elements 5a, 6a, 7a, and 9a of FIG. 5 are the same as elements 45, 46, 65, and 47 respectively, of FIG. 6. Also, the R-S flip-flop 8a of FIG. 5 has been replaced by two clocked, master/slave R-S flip-flops 68 and 69 in FIG. 6, and comparator 10a has been replaced by two comparators, 63 and 64. The long count derivation logic 34 within the dashed box of FIG. 5 has also been modified in that flip-flop 35 has been replaced by two flip-flops 66 and 67, and the multiplier network 37-42 has been replaced by the more complex network 49-62. The two comparators are necessary to distinguish among long, middle, and short pulses of MFM, and the function of the multiplier network is to provide numbers to these two comparators corresponding to the number of counts which must occur for both middle and long pulses rather than just for the number of counts for a long pulse as was necessary in FIG. 5. Note that the output from comparator 64 activates flip-flop 69 and sets the MID output line to a positive value. Likewise, the output from comparator 63 activates flip-flop 68 and sets the LONG output line to a positive value. Therefore, the detection of a short pulse is indicated by neither the MID nor the LONG line being activated upon a transition. The detection of a middle pulse is indicated by the MID output line being active and the LONG line being inactive upon a transition. A long pulse is indicated by both the MID and LONG outputs being active on a transition. Since flip-flops 67 and 66 sample the MID and LONG lines just before each transition occurs, their state indicates the type (i.e., long, middle, or short) of the previous transition length and their output lines are used to derive the proper timing windows by the multiplier network 49-62.

As mentioned previously, the function of the multiplier network is to provide numbers corresponding to the necessary numbers of counts for middle and long pulses, and in order to gain velocity tolerance and other advantages these numbers are based on the time duration and type (i.e., long, middle, or short) of the immediately preceding pulse duration rather than on absolute time references. Note that gates 52-55 provide the comparator 64 (which activates the MIDDEC line and, in turn, activates the MID output line) with a number of counts corresponding to either 5/4, 5/6, or 5/8 times the previous pulse length, for previous pulse types of short, middle, and long, respectively. Likewise, note that gates 59-62 provide the comparator 63 (which activates the LNGDEC line and, in turn, activates the LONG output line) with a number of counts corresponding to either 7/4, 7/6, or 7/8 times the previous pulse length for previous pulse types of short, middle, and long, respectively. Thus, it can be seen, for example, that if the previous flux change length was a short pulse, than LASTL equals zero, LASTM equals zero, and multipler three-input AND gates 52 and 59 gate numbers of counts corresponding to 5/4 and 7/4 times the previous pulse lengths to the comparators 64 and 63, respectively. (LASTL is the mnemonic for "last pulse had LONG line active" while LASTM is the mnemonic for "last pulse had MID line active"). Thus, if the present flux change length is less than 5/4 times the previous flux change length, then neither MIDDEC nor LNGDEC will become active and set the MID or LONG signal. If the present flux change length is at least 5/4 but less than 7/4 times the previous flux change length, then the MIDDEC but not the LNGDEC line will become active which sets the MID signal but not the LONG signal. If the present flux change length is at least 7/4 times the previous flux change length, then both the MIDDEC and LNGDEC lines become active which sets both the MID and LONG lines. Likewise, analogous statements can be made for the cases of previous flux changes which were middle pulses and long pulses. All possible cases and resulting output values are summarized in the following table, where R designates the ratio of the present flux change length to the previous flux change length.

| LSTM = 0<br>Short: LSTL = 0 | LSTM = 1<br>Middle: LSTL = 0 | LSTM = 1<br>Long: LSTL = 1 | Present Pulse is: | |
|---|---|---|---|---|
| $R < \frac{5}{4}$ | $R < \frac{5}{6}$ | $R < \frac{5}{8}$ | Short: | LONG = 0<br>MID = 0 |
| $\frac{5}{4} \leq R < \frac{7}{4}$ | $\frac{5}{6} \leq R < \frac{7}{6}$ | $\frac{5}{8} \leq R < \frac{7}{8}$ | Middle: | LONG = 0<br>MID = 1 |
| $\frac{7}{4} \leq R$ | $\frac{7}{6} \leq R$ | $\frac{7}{8} \leq R$ | Long: | LONG = 1<br>MID = 1 |

Thus each incoming transition length is compared to the length of the immediately preceding transition length in order to determine whether it will be designated a short middle, or long pulse, and no absolute time references are necessary. An analysis of the above table also indicates that if any pulse length is decoded erroneously the logic will resynchronize itself and again begin decoding correctly after an input sequence of a long or middle pulse followed by a short pulse.

It will be recognized by those skilled in the art that there are numerous alternative implementations of the logic of FIG. 6 which may make it more easily implemented with solid-state logic. Possible simplification of the circuitry includes combining multipliers 49 and 51 into a 5/4 multiplier and simple divide by two circuit. A similar combination can be made between multipliers 56 and 58. These and other logic simplifications have the effect of reducing the circuitry required without changing the function of the logic indicated in the figures.

Figure 7:
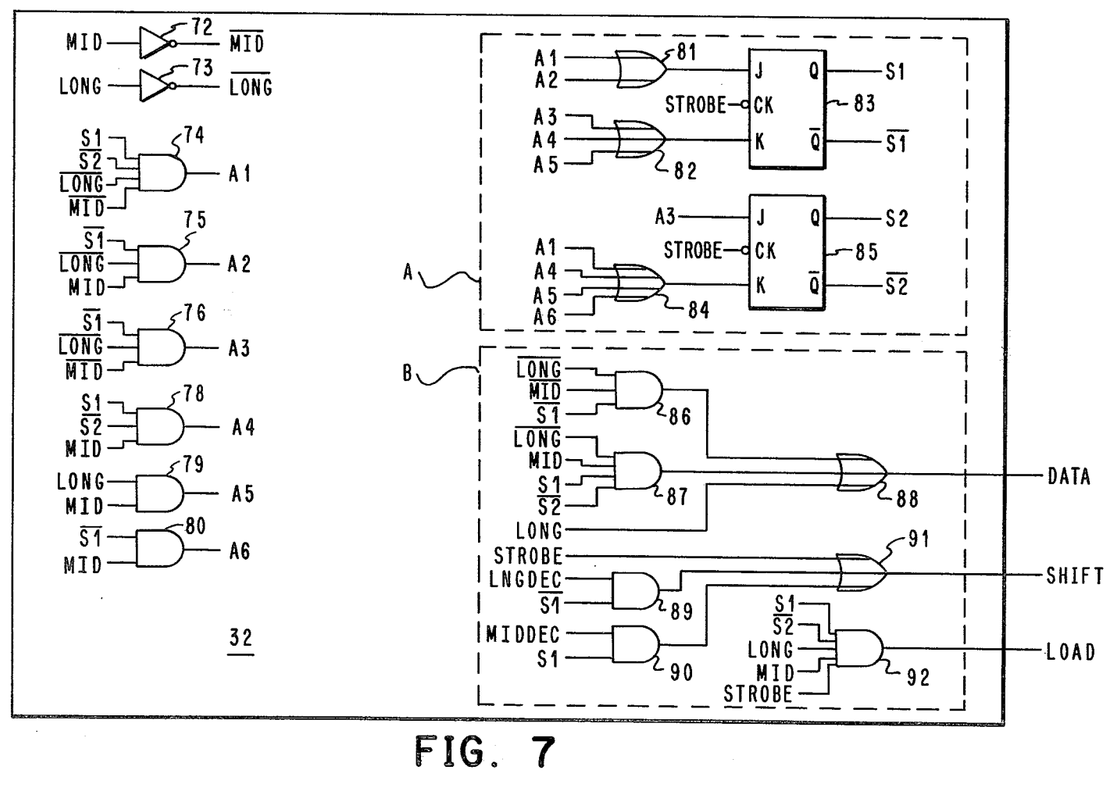
FIG. 7 is a schematic diagram of the interpreter portion of the decoding circuitry for MFM decoding.

Referring now to FIG. 7, a schematic diagram of one possible implementation of the MFM interpreter is shown. Just as for the PE and FM cases, the function of the interpreter is to translate the sequence of flux change lengths into binary data bits. Interpreter 3a of FIG. 7 can be seen as an extension of the interpreter of FIG. 3 in that flip-flops 83 and 85 and OR gates 81, 82, and 84 enclosed in box A of FIG. 7 have replaced flip-flop 21 of FIG. 3. The circuitry enclosed in box B of FIG. 7 replaces the logic network 22-25 of FIG. 3. Additional circuitry 72-80 is also necessary to generate signals required of OR gates 81, 82, and 84 of box A. External input signals LONG, MID, LNGDEC, and MIDDEC are supplied from the separator of FIG. 6. The output of a new data bit is indicated by an output pulse on the STROBE line, and the binary value of the data bit is indicated by the level of the DATA line on the leading edge of the STROBE pulse. The AND gate 92 supplies a LOAD pulse when a sequence of long, short, and middle pulses have been detected which correspond to an invalid pulse sequence for MFM encoding. Thus any invalid MFM pulse sequence can be encoded into the data stream in order to generate load pulses and thereby separate the data into segments of arbitrary lengths, or the LOAD pulse may simply be ignored or used as an error indicator. Note, however, that the last shift pulse must be ignored in some cases with the particular implementation in the figure if the load pulse is used for data separation.

The operation of the interpreter can be understood by noting that the levels of the outputs of flip-flops 83 and 85 are governed by the sequence of previous flux change lengths. These outputs are then used, along with the present flux change length as indicated by the LONG and MID lines, by the AND/OR network 86–88 to set the level of the DATA output line. In this way the binary level of the output data is determined, as previously mentioned, by not only the ratio of the present flux change length to the immediately preceding flux change length which is indicated by the MID and LONG lines, but also by the sequence of previous flux change types (i.e., sequence of long, middle, and short pulses) as indicated by signals S1 and S2. The AND/OR network 89–91 generates a SHIFT pulse upon every flux change as indicated by a STROBE signal and at certain times within long and middle pulses depending on the level of the signal S1 from flip-flop 83.

To understand how the levels of flip-flops S1 and S2 are determined, note that after any long pulse, input lines LONG and MID are active, activating signal A5 of AND gate 79. Signal A5 resets both flip-flops 83 and 85 through OR gates 82 and 84, respectively, setting both S1 and S2 to zero. If a middle pulse occurs after this long pulse, then AND gates 75 and 80 become active, activating signals A2 and A6 which sets flip-flop 83 and resets flip-flop 85 through OR gates 81 and 84, respectively. If another middle pulse occurs, then AND gate 78 becomes active, which again resets both flip-flops 83 and 85 through OR gates 82 and 84, respectively. Also note that if any number of short pulses occurred between the two middle pulses described above, then AND gate 74 would have been active, activating signal A1. Signal A1 would have applied a set input to flip-flop 83 and reset input to flip-flop 85 through OR gates 81 and 84, respectively, leaving both flip-flops at their previous levels. Thus it is seen that the states of flip-flops 83 and 85 are zero after any long pulse or after a middle pulse with any sequence of an even number of middle pulses occurring since the last long pulse, disregarding any intervening short pulses.

Also notice that if after the long pulse or the even number of middle pulses referred to above, a short pulse occurred rather than a middle pulse, then AND gate 76 would have become active, activating signal A3. Signal A3 would have, in turn, reset flip-flop 83 through OR gate 82 and set flip-flop 85. Any number of subsequent consecutive short pulses would again activate signal A3 which would have the effect of reapplying the same inputs to flip-flops 83 and 85, leaving flip-flop 83 reset and 85 set. Thus, it is now seen that after any short pulse the state of flip-flops 83 and 85 are zero and one, respectively, if zero or an even number of middle pulses have occurred since the last long pulse. If a middle pulse should occur after one of the above short pulses, however, then AND gates 75 and 80 become active, activating signals A2 and A6, which, in turn, set flip-flop 83 and reset flip-flop 85 through OR gates 81 and 84, respectively. Any subsequent sequence of consecutive short pulses activates AND gate 74, which would have the affect of reapplying the same inputs to flip-flops 83 and 85, leaving flip-flop 83 set and 85 reset. It can be seen that the output levels of flip-flops 83 and 85 are now the same as they would have been if a single middle pulse or odd number of middle pulses had occurred after a long pulse, which case was explained above.

Thus it is seen that the states of flip-flops 83 and 85 are one and zero respectively after any middle or short pulse which occurs if an odd number of middle pulses have occurred since the last long pulse, disregarding any intervening number of short pulses.

Referring now to box B, the level of the DATA line can be seen to always be a one during the time when any LONG pulse occurs because the LONG signal is applied to OR gate 88. If S1 equals zero, this means that flip-flop 83 is reset and from the above explanation this also means that either the previous pulse was a long pulse, an even number of middle pulses has occurred since the last long pulse, or only short pulses have occurred since the last long pulse. In any of these cases AND gate 86 is activated during the time a short pulse can occur and the DATA line is also activated during this time through OR gate 88. Finally, if S1 and S2 are one and zero, repsectively, (which means the outputs of flip-flops 83 and 85 are one and zero, respectively) then AND gate 87 is activated during the time which a middle pulse can occur, and the DATA line is also activated during this time through OR gate 88.

The OR gate 91 provides a SHIFT output to signal an external shift register to sample the DATA line on any of three conditions. First, any STROBE pulse is gated through OR gate 91 to provide a SHIFT pulse upon any flux transition. Second, the LNGDEC line, which is seen in FIG. 6 to be a pulse having te effect of setting the LONG signal to a high level and which thus occurs at the end of the time when a middle pulse transition could have occurred, is also gated through AND gate 89 to OR gate 91 if S1 equals zero. Third, the MIDDEC line, which is seen in FIG. 6 to be a pulse having the effect of setting the MID signal to a high level and which thus occurs at the end of the time when a short pulse could have occurred, is similarly gated through AND gate 90 to OR gate 91 if S1 equals one. The extra SHIFT pulses occurring between transitions upon certain LNGDEC and MIDDEC pulses in addition to those occurring at every transition upon each STROBE pulse are necessary in MFM encoding because MFM data patterns, unlike those of FM or PE, may have more than one bit per flux transition.

To complete the description, note that in the above implementation, the rising edge of each SHIFT pulse indicates that a new data bit should be shifted from the DATA line into an external shift register. This is because the DATA line may be changing state on the falling edge of a SHIFT signal, bit it is always stable during the rising edge of a SHIFT pulse. Also, note that other implementations of the interpreter circuitry are possible using well known techniques of logic design. For example, well known logic design techniques may be used to simplify and/or consolidate some of the logic elements shown in FIG. 7. However, all implementations would perform the same translation function from pulse lengths to data bits by keeping track of the sequence of previous pulse lengths as was pointed out in the summary above.

The above description of velocity tolerant decoding of fixed length codes has been related to data encoded on magnetic recording systems in which the velocity between the magnetic head and media is not necessarily constant. The decoding methods of this invention, however, are equally applicable to any data communication or data storage system in which the data rate may be varying. Such communication systems include transmission systems over wires, radio waves, and optical links;

and other data storage systems include optical storage systems. In addition, the techniques of the invention are useful in systems which have inaccurate clocks whose average or instantaneous frequencies may be varying over a relatively wide range. This can be seen in the above example of PE by noting that the ratio of the number of clock pulses occurring between one pair transitions to the number of pulses occurring between the immediately following pair of transitions is negligibly affected by a slowly varying clock rate.

It will also be noted that the above described decoding technique allows velocity tolerance to be built into a decoder by the use of all digital components which can be fabricated onto a single silicon wafer. Present methods achieve a degree of limited velocity tolerance by the use of variable frequency oscillators which do not generally tolerate the range of velocity tolerance allowed by this invention, do not generally allow the rate of change of velocity variations allowed by this technique, and usually involve the use of more expensive and less compact analog circuitry.

While the invention has been shown and described with reference to particular embodiments thereof, it will be understood by those skilled in the art that the foregoing and other changes in form and details may be made therein without departing from the spirit and scope of the invention.

What is claimed is:

1. A method of detecting data transitions or clock transitions in a sequence of signal transitions representing data encoded by phase encoding or frequency modulation, respectively, wherein the time duration between any two consecutive signal transitions is characterized as either long or short, comprising:
    detecting the occurrence of each of said signal transitions;
    generating a first pulse responsive only to each detection of a long time duration between two of said signal transitions; and
    generating a signal indicative of the detection of a data transition or clock transition, respectively, responsive to the occurrence of an even number of signal transitions sebsequent to the previous data transition or clock transition, respectively, and the absence of said first pulse during the time between said previous data transition or clock transition and the last of said even number of signal transitions.

2. A method of detecting data transitions or clock transitions in a sequence of signal transitions representing data encoded by phase encoding or frequency modulation, respectively, wherein the time duration between any two consecutive signal transitions is characterized as either long or short, comprising:
    detecting the occurrence of each of said signal transitions;
    generating a first pulse responsive only to each detection of a long time duration between two of said signal transitions; and
    generating signal indicative of the detection of a data transition or clock transition, respectively, responsive to the occurrence of two consecutive ones of said first pulse and the absence of any of said signal transitions intervening between said first pulse signals.

3. A method of detecting data transitions or clock transitions in a sequence of signal transitions representing data encoded by phase encoding or frequency modulation, respectively, wherein the time duration between any two consecutive signal transitions is characterized as either long or short, comprising:
    detecting the occurrence of each of said signal transitions;
    generating a first pulse responsive only to each detection of a long time duration between two of said signal transitions; and
    generating a signal indicative of the detection of a data transition or clock transition, respectively, responsive to the occurrence of two of said first pulses separated by an even number of said signal transitions.

4. A method of detecting data transitions or clock transitions in a sequence of signal transitions representing data encoded by phase encoding or frequency modulation, respectively, wherein the time duration between any two consecutive signal transitions is characterized as either long or short, comprising:
    detecting the occurrence of each of said signal transitions;
    generating a first pulse responsive only to each detection of a long time duration between two of said signal transitions;
    generating a signal indicative of the detection of a data transition or clock transition, respectively, responsive to the occurrence of an even number of signal transitions subsequent to the previous data transition or clock transition, respectively, and the absence of said first pulse during the time between said previous data transition or clock transition and the last of said even number of signal transitions;
    generating a signal indicative of the detection of a data transition or clock transition, respectively, responsive to the occurrence of two consecutive ones of said first pulse and the absence of any of said signal transitions intervening between said first pulse signals; and
    generating a signal indicative of the detection of a data transition or clock transition, respectively, responsive to the occurrence of two of said first pulses separated by an even number of said signal transitions.

5. The method of claim 1, or 2, or 3 wherein said step of generating said first pulse further comprises:
    comparing the time period between two consecutive signal transitions to a referenced time; and
    generating said first pulse when said time period between signal transitions is equal to or greater than said reference time.

6. The method of claim 1, or 2, or 3, wherein said step of generating said first pulse further comprises:
    comparing the time period between two consecutive signal transitions to the time period between the first of said two consecutive signal transitions and the signal transition immediately preceding said first of said two consecutive signal transitions; and
    generating said first pulse when said time period between said two consecutive signal transitions is at least three-halves the time period between said first of said two consecutive signal transitions and said signal transition immediately preceding said first of said two consecutive signal transitions when said time period between said first of said two consecutive signal transitions and said signal transition immediately preceding said first of said two consecutive signal transitions is a short time duration.

7. A system for detecting data transitions or clock transitions in a sequence of signal transitions representing data encoded by phase encoding or frequency modulation, respectively, wherein the time duration between any two consecutive signal transitions is characterized as either long or short, comprising:

means for detecting the occurrence of each of said signal transitions;

means for generating a first pulse responsive only to each detection of a long time duration between two of said signal transitions; and means for generating a signal indicative of the detection of a data transition or clock transition, respectively, responsive to the occurrence of an even number of signal transitions subsequent to the previous data transition or clock transition, respectively, and the absence of said first pulse during the time between said previous data transition or clock transition and the last of said even number of signal transitions.

8. A system for detecting data transitions or clock transitions in a sequence of signal transitions representing data encoded by phase encoding or frequency modulation, respectively, wherein the time duration between any two consecutive signal transitions is characterized as either long or short, comprising:

means for detecting the occurrence of each of said signal transitions;

means for generating a first pulse responsive only to each detection of a long time duration between two of said signal transitions;

means for generating a signal indicative of the detection of a data transition or clock transition, respectively, responsive to the occurrence of an even number of signal transitions subsequent to the previous data transition or clock transition, respectively, and the absence of said first pulse during the time between said previous data transition or clock transition and the last of said even number of signal transitions;

means for generating a signal indicative of the detection of a data transition or clock transition, respectively, responsive to the occurrence of two consecutive ones of said first pulse and the absence of any of said signal transitions intervening between said first pulse signals; and means for generating a signal indicative of the detection of a data transition or clock transition, respectively, responsive to the occurrence of two of said first pulses separated by an even number of said signal transitions.

9. A method of deriving signals for decoding binary data from a sequence of signal transitions representing said data encoded by modified frequency modulation encoding, wherein the time duration between any two consecutive signal transitions is characterized as either long, middle, or short, comprising:

detecting the occurrence of each of said signal transitions;

generating a first pulse responsive only to each detection of a long time duration between two of said signal transitions;

generating a second plate responsive only to each detection of a middle time duration between two of said signal transitions;

generating a third signal indicative of the detection of the occurrence of a signal transition with an even number of second pulses having occurred since the last first pulse; and generating a fourth signal responsive to the occurrence of a short time duration between signal transitions or said second pulse, with an odd number of said second pulses having occurred since the last first pulse.

10. A method of decoding binary data from a sequence of signal transitions representing said data encoded by modified frequency modulation encoding, wherein the time duration between any two consecutive signal transitions is characterized as either long, middle, or short, comprising:

detecting the occurrence of each of said signal transitions;

generating a first pulse responsive only to each detection of a long time duration between two of said signal transitions;

generating a second pulse responsive only to each detection of a middle time duration between two of said signal transitions;

generating a third signal indicative of the detection of the occurrence of a signal transition with an even number of second pulses having occurred since the last first pulse;

generating a fourth signal responsive to the occurrence of a short time duration between signal transitions or said second pulse, with an odd number of said second pulses having occurred since the last first pulse; and outputting a one responsive to said third signal when the signal transition following said third signal occurs in said short time duration after said third signal.

11. The method of claim 10 further comprising:
outputting a zero responsive to said third signal when said pulse following said third signal is a second pulse.

12. The method of claim 10 further comprising:
outputting a zero followed by a one responsive to said third signal when said pulse following said third signal is a first pulse.

13. The method of claim 10 further comprising:
outputting a zero responsive to said fourth signal when said signal transition following said fourth signal occurs in said short time duration after said fourth signal.

14. The method of claim 10 further comprising:
outputting a zero followed by a one responsive to said fourth signal when said pulse following said fourth signal is a second pulse.

15. The method of claim 10 further comprising:
outputting an intercharacter mark responsive to said fourth signal when said pulse following said fourth signal is a first pulse.

16. A method of decoding binary data from a sequence of signal transitions representing said data encoded by modified frequency modulation encoding, wherein the time duration between any two consecutive signal transitions is characterized as either long, middle, or short, comprising:

detecting the occurrence of each of said signal transitions;

generating a first pulse responsive only to each detection of a long time duration between two of said signal transitions;

generating a second pulse responsive only to each detection of a middle time duration between two of said signal transitions;

generating a third signal indicative of the detection of the occurrence of a signal transition with an even number of second pulses having occurred since the last first pulse;

generating a fourth signal responsive to the occurrence of a short time duration between signal transitions or said second pulse, with an odd number of said second pulses having occurred since the last first pulse;

outputting a one responsive to said third signal when the signal transition following said third signal occurs in said short time duration after said third signal;

outputting a zero responsive to said third signal when said pulse following said third signal is a second pulse;

outputting a zero followed by a one responsive to said third signal when said pulse following said third signal is a first pulse;

outputting a zero responsive to said fourth signal when said signal transition following said fourth signal occurs in said short time duration after said fourth signal; and outputting a zero followed by a one responsive to said fourth signal when said pulse following said fourth signal is a second pulse.

17. A system for deriving signals for decoding binary data from a sequence of signal transitions representing said data encoded by modified frequency modulation encoding, wherein the time duration between any two consecutive signal transitions is characterized as either long, middle, or short, comprising:

means for detecting the occurrence of each of said signal transitions;

means for generating a first pulse responsive only to each detection of a long time duration between two of said signal transitions;

means for generating a second pulse responsive only to each detection of a middle time duration between two of said signal transitions;

means for generating a third signal indicative of the detection of the occurrence of a signal transition with an even number of second pulses having occurred since the last first pulse; and means for generating a fourth signal responsive to the occurrence of a short time duration between signal transitions or said second pulse, with an odd number of said second pulses having occurred since the last first pulse.

18. A system for decoding binary data from a sequence of signal transitions representing said data encoded by modified frequency modulation encoding, wherein the time duration between any two consecutive signal transitions is characterized as either long, middle, or short, comprising:

means for detecting the occurrence of each of said signal transitions;

means for generating a first pulse responsive only to each detection of a long time duration between two of said signal transitions;

means for generating a second pulse responsive only to each detection of a middle time duration between two of said signal transitions;

means for generating a third signal indicative of the detection of the occurrence of a signal transition with an even number of second pulses having occurred since the last first pulse;

means for outputting a one responsive to said third signal when the signal transition following said third signal occurs in said short time duration after said third signal.

19. A system for decoding binary data from a sequence of signal transitions representing said data encoded by modified frequency modulation encoding, wherein the time duration between any two consecutive signal transitions is characterized as either long, middle, or short, comprising:

means for detecting the occurrence of each of said signal transitions;

means for generating a first pulse responsive only to each detection of a long time duration between two of said signal transitions;

means for generating a second pulse responsive only to each detection of a middle time duration between two of said signal transitions;

means for generating a third signal indicative of the detection of the occurrence of a signal transition with an even number of second pulses having occurred since the last first pulse;

means for generating a fourth signal responsive to the occurrence of a short time duration between signal transitions or said second pulse, with an odd number of said second having occurred since the last first pulse;

means for outputting a one responsive to said third signal when the signal transition following said third signal occurs in said short time duration after said third signal;

means for outputting a zero responsive to said third signal when said pulse following said third signal is a second pulse;

means for outputting a zero followed by a one responsive to said third signal when said pulse following said third signal is a first pulse;

means for outputting a zero responsive to said fourth signal when said signal transition following said fourth signal occurs in said short time duration after said fourth signal; and means for outputting a zero followed by a one responsive to said fourth signal when said pulse following said fourth signal is a second pulse.

* * * * *